(12) United States Patent
Bowles et al.

(10) Patent No.: US 9,114,690 B1
(45) Date of Patent: Aug. 25, 2015

(54) MODULAR ROOF ASSEMBLIES FOR VEHICLES

(71) Applicant: Webasto-Edscha Cabrio GmbH, Stockdorf (DE)

(72) Inventors: Jason Bowles, Owosso, MI (US); Magnus Sviberg, Deggendorf (DE); Georg Kopp, Plattling (DE); Alexander Haimerl, Bogen (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/178,010

(22) Filed: Feb. 11, 2014

(51) Int. Cl.
| B60J 7/00 | (2006.01) |
| B60J 7/02 | (2006.01) |
| B60J 7/06 | (2006.01) |
| B60J 7/11 | (2006.01) |
| B60J 7/20 | (2006.01) |
| B60R 21/13 | (2006.01) |

(52) U.S. Cl.
CPC .. *B60J 7/02* (2013.01); *B60J 7/061* (2013.01); *B60J 7/11* (2013.01); *B60J 7/20* (2013.01); *B60R 21/13* (2013.01)

(58) Field of Classification Search
CPC ............ B60J 7/061; B60J 7/062; B60J 7/106; B60J 7/11; B60J 7/20; B60R 21/13
USPC ........ 296/216.08, 219, 218, 102, 103, 190.03
See application file for complete search history.

(56) References Cited

U.S. PATENT DOCUMENTS

| 4,828,317 A * | 5/1989 | Muscat ......................... 296/122 |
| 6,267,433 B1 * | 7/2001 | Bayer et al. .................. 296/121 |
| 6,435,606 B1 | 8/2002 | Miklosi et al. |
| 6,916,061 B2 | 7/2005 | Obendiek |
| 2005/0134096 A1 * | 6/2005 | Fallis et al. ................... 296/218 |

FOREIGN PATENT DOCUMENTS

| DE | 19704173 C1 | 4/1998 |
| DE | 19939724 C1 | 8/1999 |
| DE | 19927234 C1 | 7/2000 |
| DE | 20006258 UI | 7/2000 |
| DE | 19938605 C1 | 10/2000 |
| DE | 19943765 C1 | 3/2001 |
| DE | 10242773 B4 | 7/2004 |
| DE | 102004017569 B4 | 11/2006 |
| DE | 102004017327 B4 | 9/2008 |

* cited by examiner

*Primary Examiner* — Dennis H Pedder
(74) *Attorney, Agent, or Firm* — Fitch, Even, Tabin & Flannery LLP

(57) ABSTRACT

A modular roof assembly includes a pair of side rails configured for attachment to longitudinal roll bar members of a vehicle frame by at least one fastener. The side rails extend a direction along a length of the vehicle frame and include at least one guideway to slidably receive transverse tensioning bows and a track car for a soft top and include at least one attachment member adapted to latchably receive at least one hard top panel.

9 Claims, 20 Drawing Sheets

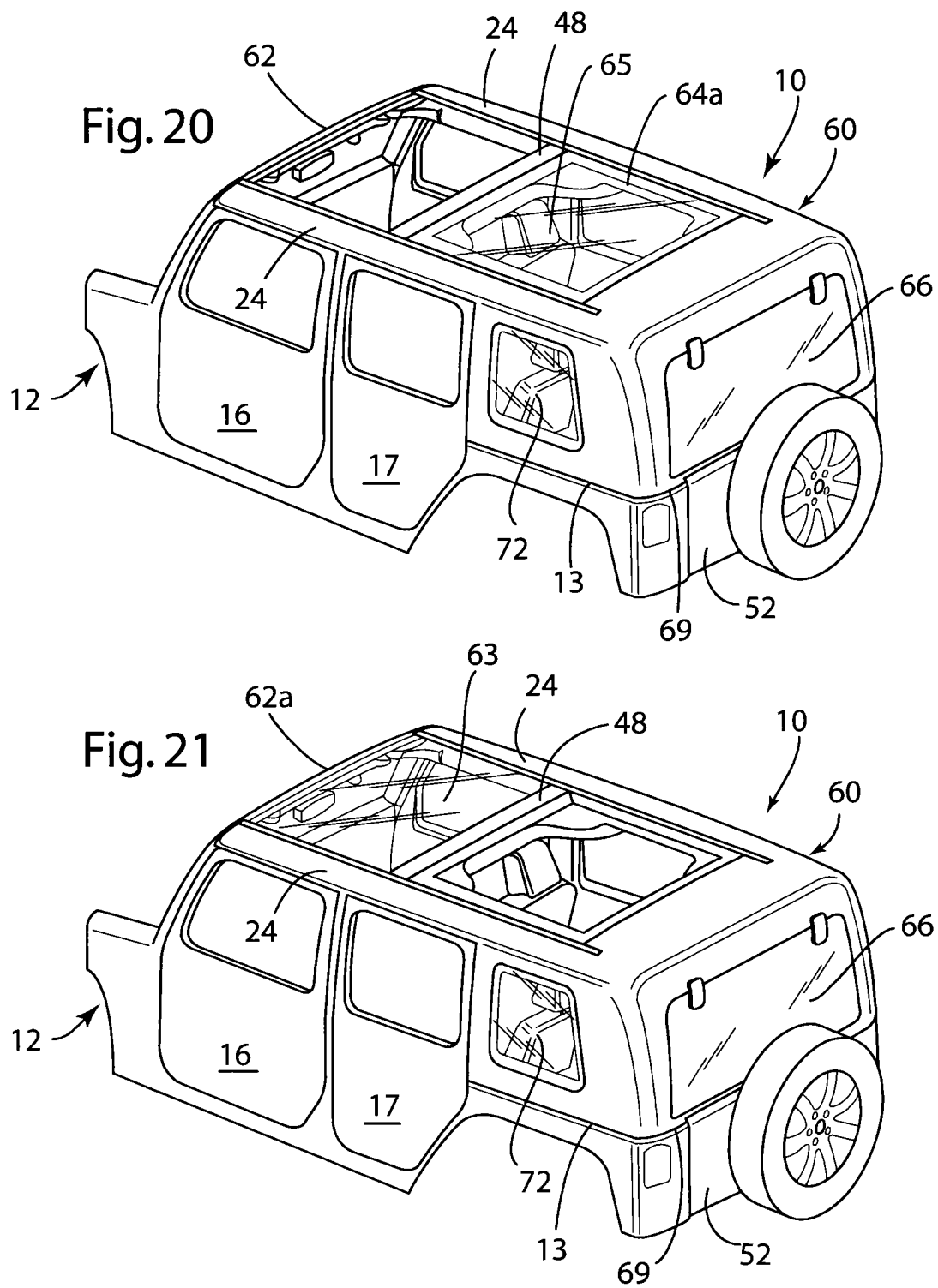

MODULAR ROOF ASSEMBLIES FOR VEHICLES

FIELD

Described herein are modular roof assemblies for vehicles and particularly modular roof assemblies for vehicles using side rails to interchangeably mount a variety of hardtop panel configurations or a convertible soft top canopy.

BACKGROUND

Vehicles can be configured for various hard top or soft top convertible roofs. Basic convertible mechanisms can be found in patent applications and patents such as: DE 197 04 173 C1, DE 199 27 234 C1, DE 199 38 605 C1, DE 199 39 724 C1, DE 199 43 765 C2, DE 10 2004 017 327 B4, DE 10 2004 017 569 B4, DE 102 42 773 B4, and DE 200 06 258 U1, the specifications of which are incorporated herein by reference.

Challenges in the art often arise from the extensive (and expensive) structures often needed for vehicle convertible tops (both soft tops and hardtops) and their associated mechanisms (collectively referred to herein as convertible assemblies). In most instances a customized convertible assembly must be developed for each vehicle application. As part of that development, convertible assemblies typically require the vehicle body (e.g., BIW or Body in White) to be modified to accommodate the attachment points of such assemblies to the vehicle, including storage areas for the roof in a retracted position. BIW refers to the stage in automotive design or automobile manufacturing in which a car body's sheet metal components have been welded together, but before moving parts (doors, hoods, and deck lids as well as fenders) the motor, chassis sub-assemblies, or trim (glass, seats, upholstery, electronics, etc.) have been added and before painting. In some vehicles, an additional complication is that there are no practical or suitable attachment points or storage areas for the convertible roof assembly within the vehicle body structure.

The need for design modifications or accommodations in these types of applications can significantly add to the overall cost, time, resources and even weight of the vehicle. Improved design flexibility, interchangeability and modularity in convertible assemblies are thus desired.

SUMMARY

Accordingly, described herein are modular roof assemblies for vehicles and, particularly, modular roof assemblies for vehicles using side rails to interchangeably mount a variety of hardtop panel configurations or a convertible soft top canopy.

In one approach, a modular roof assembly can have a pair of side rails configured for attachment to a pair of longitudinal roll bar members of a vehicle frame by at least one fastener, the side rails extending in a direction along a length of the vehicle frame rearward from a wind screen frame of the vehicle frame; the side rails having at least one inboard guideway to slidably receive transverse tensioning bows and a track car for a soft top; and the side rails further adapted to receive at least one hard top panel.

In another approach, the modular roof assembly can also include a rear assembly configured for attachment by an attachment means from a C-pillar region of the vehicle frame to a D-pillar region of the vehicle frame. The rear assembly may comprise a cassette adapted to be sealingly coupled to rearward ends of the side rails and including a motive force to drive the track car and tensioning bows along a predetermined travel path within the at least one guideway.

In another approach, the soft top is attached to the tensioning bows providing a weather tight seal for the vehicle roof when the tensioning bows are in an extended position. The rear assembly may also have a kinematic to lower a retracted soft top and rear cassette to a sill of the vehicle frame. The rear cassette may also have a soft top rear panel having a backlite and/or a soft top rear panel having a backlite proving a weather tight seal with a sill of the vehicle frame. In one approach, this weather tight seal with the sill of the vehicle frame can be an upwardly pivoting hatch. The modular roof assembly can also include at least one rigid roof panel, releasably attached to at least the side rails.

In another approach, a spacing adjustment device is provided between a first and a second component of a convertible roof assembly for a vehicle having a body having a first thickness at a first end and a second, greater thickness, at a second end; an inner surface configured to conform to an exterior contour of the first component and an exterior surface opposite the inner surface and configured to conform to the contours of the second component; the body having at least two sections each having a different thickness between the inner and exterior surfaces; wherein the thickness of the at least two sections increases in step wise manner from the first end to the second end of the body. The spacing adjustment device can have at least 4 sections are provided and each section increases by about 2 mm in thickness relative to a preceding adjacent section. The interior surface of the spacing adjustment device can be configured to follow contours of a longitudinal roll-bar frame member for a vehicle. In another approach, a mechanism to attach a first component to a second component is provided having a fastener to adjustably and removably attach the first component to the second component; the fastener having a spacing adjustment device between the first and second component, comprising: a body having a first thickness at a first end and a second, greater thickness, at a second end; an inner surface configured to conform to an exterior contour of the first component and an exterior surface opposite the inner surface and configured to conform to the contours of the second component; the body having at least two sections each having a different thickness between the inner and exterior surfaces; wherein the thickness of the at least two sections increases in step wise manner from the first end to the second end of the body. The first component can be a vehicle body component and the second component can be a convertible roof assembly component. The vehicle body component can be an anti-roll bar. The fastener configuration can be latch/strikers, bolts, glues, sealants, combinations thereof, and the like.

In another approach, a modular roof top assembly for a vehicle can have a vehicle frame having at least one roll bar member; at least one rail attached to the at least one roll bar member by a fixing means; and the at least one rail having a guideway to slidably receive transverse tensioning bows for a soft top canopy. The fixing means can be at least one matching threaded nut and a bolt. The orientation of the at least one roll bar member to the at least one rail can be adjustable by a distance adjustment spacer provided therebetween. The distance adjustment spacer can be at least one washer having a bore through which the fixing means extends.

Numerous other advantages and features of the present disclosure will be become readily apparent from the following detailed description and the embodiments therein, from the claims and from the accompanying drawings.

BRIEF DESCRIPTION OF THE DRAWINGS

FIG. 20 illustrates a perspective view of an alternative embodiment of a hard top convertible assembly without an attached front panel but including an attached middle clear panel and rear panel with backlite.

FIG. 21 illustrates a perspective view of an alternative embodiment of a hard top convertible assembly without an attached middle hardtop panel but including an attached front clear hardtop panel and rear panel with backlite.

DETAILED DESCRIPTION

Advantageously, described herein are modular roof assemblies for vehicles. In one approach, a soft top convertible assembly is provided to retract and extend a vehicle soft top canopy using a guide track disposed within prefabricated rails (e.g., side rails) and associated mechanisms. The side rails are easily adaptable to a variety of vehicle body configurations and are easy to install. The side rail components allow for easy after-market installations.

Figure 6:
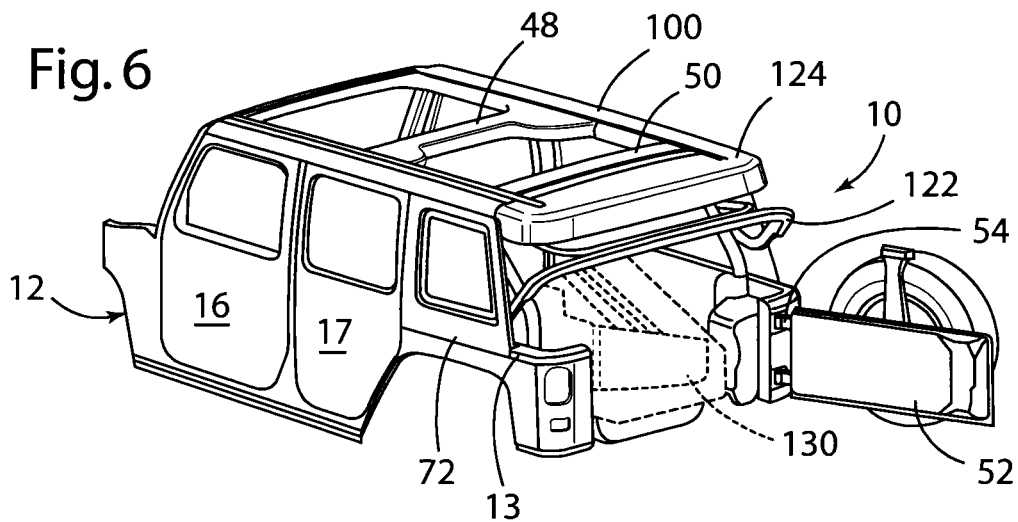
FIG. 6 is the same view as in FIG. 5, but shown with the rear gate and hatch in an open position to illustrate accommodation of a large item of cargo (shown in dashed lines).
Figure 7:
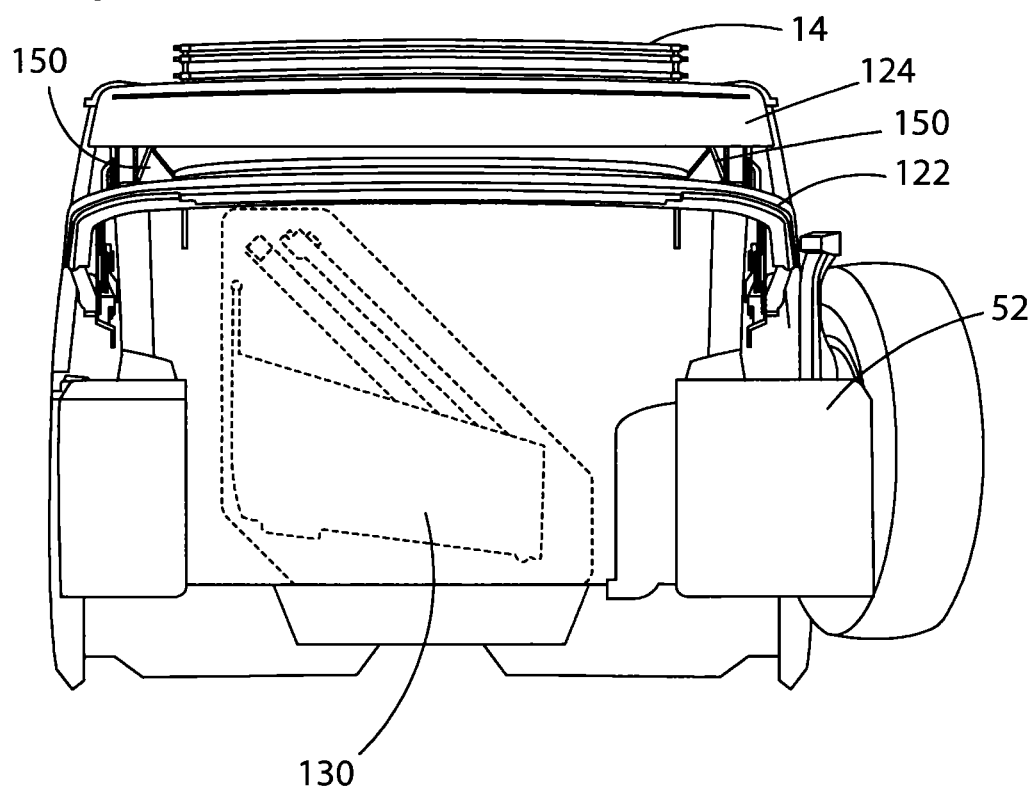
FIG. 7 is a rear elevational view of FIG. 6.

The present modular roof assemblies can be configured for attachment on vehicles where the soft top can be retracted to the rear of the vehicle, but still forward of the vehicle's CHMSL (Center High Mount Stop Light, or third brake light) as shown, for example, in FIGS. 6-7. Components of some modular roof assemblies described herein may alternately include rigid roof panels to provide a hard top configuration. The rigid roof panels can be configured to be easily fastenable to and removable from the side rails. The side rails according to the present embodiments can be configured to support soft top configurations, hard top configurations, or a combination of hard top and soft top configurations. Where the side rails support both hard and soft top configurations, the soft top components are preferably removed prior to installation of any rigid panels.

It is also noted that the side rails according to the embodiments described herein can be built into the bodywork of a vehicle and provided as an OME option. Preferably though, the side rails are configured for attachment to a vehicle having open anti-roll bars (cage) for the upper portion of the vehicle frame. The present embodiments provide flexibility in that they are attachable to different vehicle configurations and offer several advantages. Such advantages include easy after-market installation of a complete convertible assembly onto a vehicle having a roll-bar cage frame.

Another advantage of the present roof assemblies is that no vehicle modification or alteration is necessary to install the present roof assemblies on the vehicle. The present assemblies can also be easily detached and removed from the vehicle framework and re-fitted. A further advantage is that a common rear quarter window panel can be used interchangeably between the soft top and hard top configurations of the present roof assemblies.

The components of the present roof assemblies are preferably designed to permit easy assembly by one individual, and are small enough to fit through a standard 36 inch door for easy and convenient storage and transport. The roof assemblies described herein provide a low profile side view roof system and improved security (due at least to the absence of zippered components). In some embodiments, the roof assemblies described herein can include removable modular components such as side windows, doors, rails, and even the roof assembly itself may be removed and later again installed.

The modular design of the roof assemblies described herein allow for greater design flexibility in that a design can have a simplified realization of vehicle body; improved layout and package; reduced number of parts required to provide a convertible mechanism; improved rigidity and stability of the modular components of the assemblies; reduction in overall assembly cost; and overall assembly weight reduction in that the assembly rigidity is provided primarily by the anti-roll bar or similar framing structure of the vehicle.

The preferred embodiments of the roof assemblies described herein provide a pair of roof side rails (side rails, roof rails), which are easily attachable (and removable) as an after-market accessory to predetermined points of vehicle having a roll-cage (roll-bar) framework. With the side rails installed, modular components, such as soft top convertible and/or rigid hard-top panels can then be fastened to the side rails. Optional quick release latches can allow easy removal of the entire assembly or individual components of the roof system. Preferred embodiments illustrate side rails 24 as being mirror images of each other to orient its track guide assembly 20 inboard towards the vehicles longitudinal centerline.

The present side rail structures can also sealingly attach to the vehicle framework. The side rails can include a mechanism and rails for the soft-top variant, the attachment elements for the hard top variant, as well as a sealing assembly for controlling water between the side rails and the convertible assemblies (both variants). The side rails can be installed to extend along the sides of the vehicle either from the windscreen frame, or further back of the windscreen frame (along the length of the vehicle) to the rear of the vehicle, or anywhere in between (such as at the top of the front and possible rear door as well as eventual rear quarter panel or window).

Figure 2:
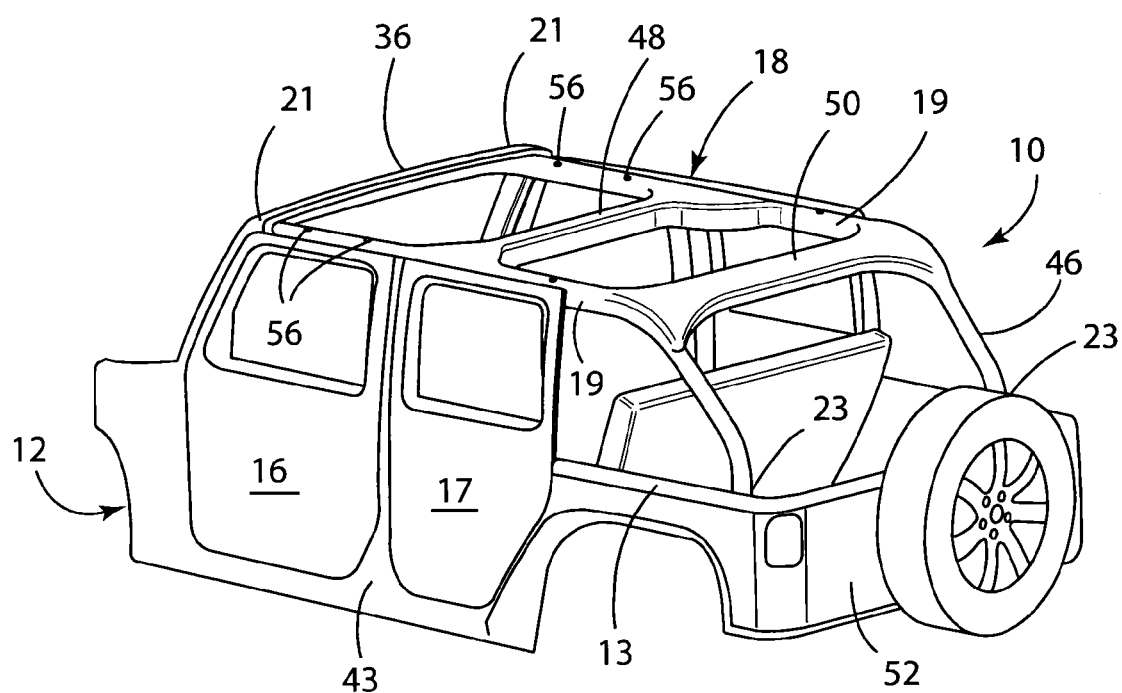
FIG. 2 is a perspective view of a prior art partial vehicle body framework having a roll bar to which a modular convertible assembly according to one or more of the present embodiments may be secured.

Turning now to the figures, for illustrative purposes only, FIG. 2 shows a vehicle 10 suitable for installation of the present modular roof assemblies. Again, it is noted that other types of vehicles having exposed frame components can also be equipped with the roof assemblies described herein. As shown, vehicle 10 has a body 12, with a forward door 16 an optional rear door 17, and an optional rear gate 52 (having rear gate hinges 54 shown, for example, in FIG. 6).

As shown in FIG. 2, above a sill 13 of the body 12 of the vehicle is an exposed roll cage frame 18. This illustrated roll cage frame 18 has two longitudinal roll bars 19 generally defining the side of the passenger compartment of the vehicle 10. Roll cage frame 18 also has cross-bar 48 and cross-bar 50 to add rigidity. Further strength is added to the roll cage frame 18 by a cross bar of the windscreen frame 36. Each of the roll bars 19 may attach to the windscreen frame 36 at point 21 at its forward end, and to the D Pillar 46 at the aft end 23. It is also noted that longitudinal roll bars 19 may have OME ("Original Manufacturer Equipment") attachment points 56 at predetermined points as shown in FIG. 2 to permit attachment of OME accessories. The attachment points 56 for the removable side rails described in more detail below are located along the vehicle length and are positioned along the length of longitudinal roll-over bars 19. There might be one, two, three, or more attachment points 56 depending on overall length of the vehicle 10 and configuration of the side rails. The attachment points 56, instead of being installed during manufacturing of the vehicle 10, can be also installed during the installation of the roof assemblies according to the present embodiments, if needed.

Figure 3:
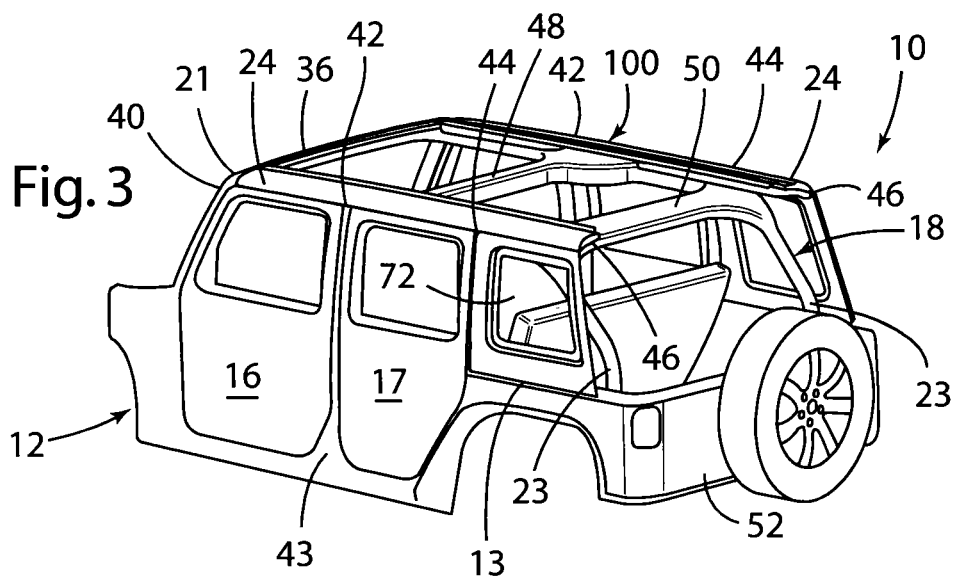
FIG. 3 is a perspective view of the vehicle framework of FIG. 2 with the side rails and rear quarter panels according to one embodiment of the modular convertible assembly secured thereto.
Figure 11:
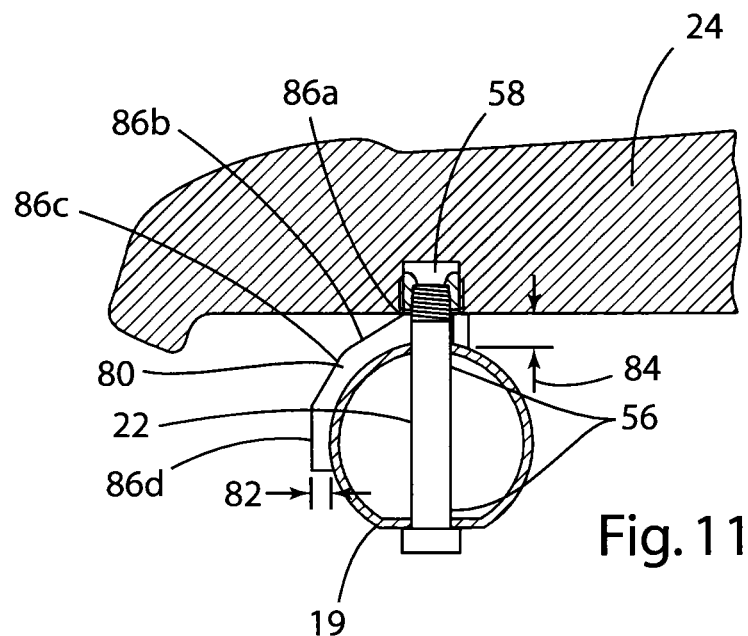
FIG. 11 is a sectional end view taken along section lines XI-XI in FIG. 10 and showing an exemplary attachment of a side rail of the convertible assembly of FIG. 10 to a roll bar of the vehicle framework via an option adjustment element.
Figure 12:
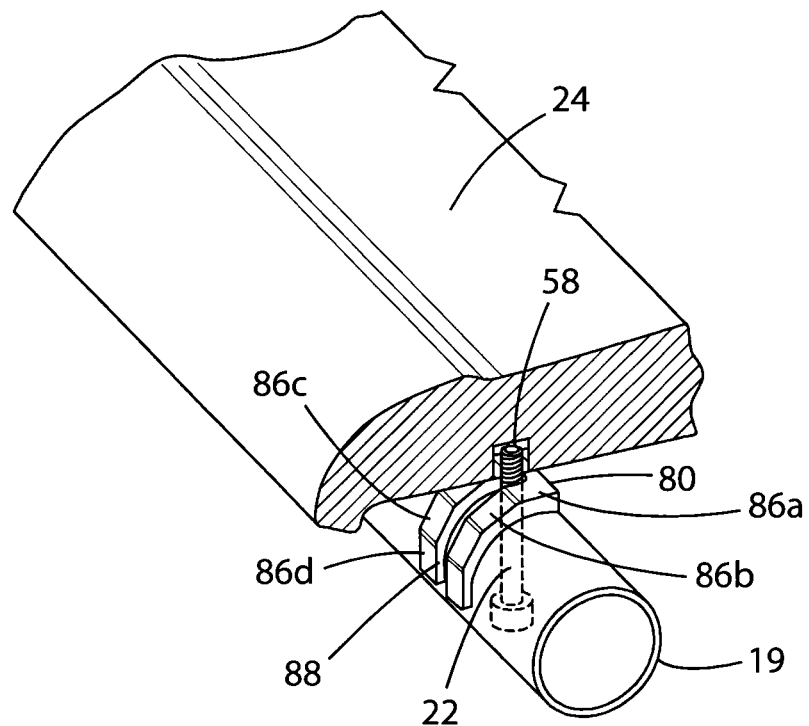
FIG. 12 is a perspective cutaway view of the exemplary attachment of the side rail and the roll bar of FIG. 11 via the optional adjustment element.

As shown in FIG. 3, side rails 24 permit attachment of the exemplary embodiments of modular roof assemblies to vehicle 10. As shown in FIGS. 11-12, side rails 24 can have be means such as a threaded bore 58 (e.g., a nut) configured to receive and fasten side rails 24 to roll cage frame 18 using fastener 22 (e.g., a bolt). Threaded bore 58 is oriented to match the corresponding preconfigured positions of attachment points 56 on roll cage frame 18. In the illustrated preferred embodiment, each of the side rails 24 can be made as a single piece extending along the desired length (a part of the length or entire length) of the vehicle 10, with the two side rails 24 on each side of the vehicle 10 being mirror images of each other. Optionally, one or both of the side rails 24, instead of having a one-piece construction, can be formed from a plurality of modular sections, which can be connected in series. Optionally, attachment elements can also be placed between modular sections of the side rails 24 to allow hinging of the modular sections to conform to practically any shape of the vehicle body 12. The modular sections themselves could optionally contain hingable connections to follow the contours of the respective longitudinal roll bar 19. Hard top configurations (described in more detail below) can be configured in separate sections or hinged together to enable a smaller folded package volume.

The side rails 24 can be made out of one material or several materials in various manufacturing and assembly methods. Materials that may be used to manufacture the side rails 24 can include metals, composites, extrusions, plastics and various polymers, combinations thereof, and the like. The present assemblies can also be configured for placement on vehicles having doors with frames or frameless doors.

As shown in FIGS. 2 and 3, longitudinal roll-bars 19 extend from the A-pillar (post) 40, along to B-pillar 42 and C-pillar 44 to a lower corner of D-pillar 46 on both sides of vehicle body 12 and are connected to each other transversely by cross-bars 48 and 50. The longitudinal roll-over bar 19 is attached to the corners of windscreen frame 36 of the vehicle 10. Vertical members of roll cage frame 18 extend down to the vehicle sill 13 of B-pillar 42, where they are mechanically attached at 43 as shown in FIG. 3. Aft ends 23 of the longitudinal roll-bars 19 are mechanically attached to the D-pillar 46 of the vehicle body 12.

Figure 15:
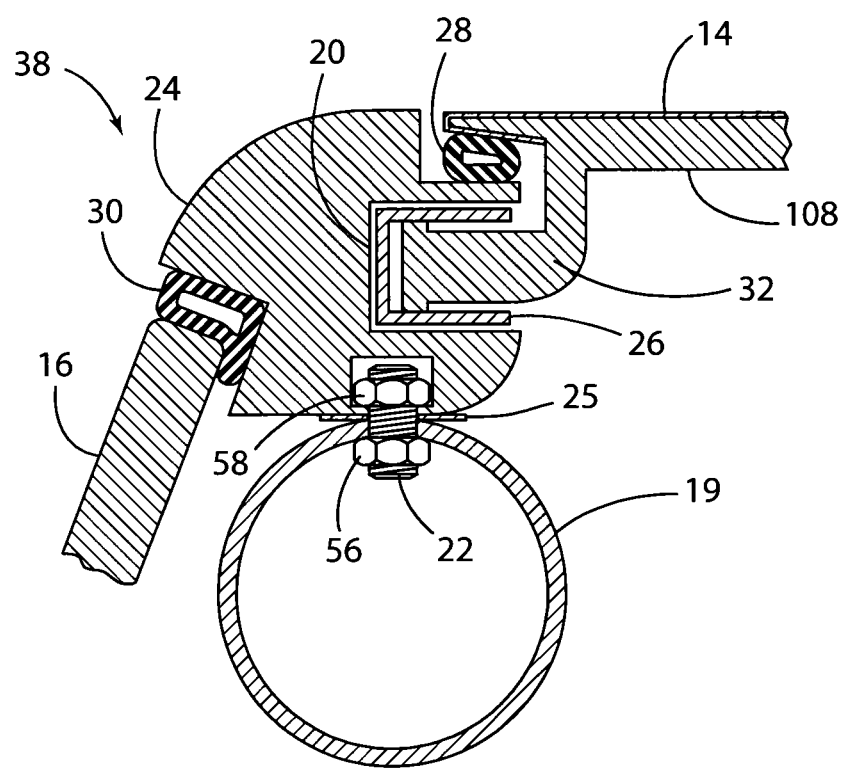
FIG. 15 is a sectional end view taken along a line similar to the line XI-XI in FIG. 10 and showing one alternative embodiment of a side rail of a soft top convertible assembly and an exemplary alternative fastener for attaching the side rail to the roll bar of the vehicle framework.

Various attachment members can be employed to fasten the side rails 24 to roll cage frame 18, such as latch/strikers combinations, bolts, glues, sealants, combinations thereof, and the like. Side rails 24 can be attached to roll-cage frame 18 using one or more fastening means to fasten side rails 24 to roll-cage frame 18 as shown, for example, in FIGS. 11, 12 and 15. The side rails 24 may be attached to the roll-cage frame 18 via a fixed (non-detachable) attachment or a detachable attachment. The side rails 24 may be attached directly to longitudinal roll bars 19 (or similar) structure or indirectly via a separate vehicle part attached to longitudinal roll bars 19. FIGS. 11, 12 and 15 show some exemplary attachment mechanisms for attachment of side rails 24 to longitudinal roll bars 19. A weather resistant sealant can also be disposed between side rail 24 and longitudinal roll bar 19. FIG. 15 also shows the insertion of a spacer (washer) 25 to provide a desired spacing between side rail 24 and longitudinal roll bar 19 (distance adjustment member). Such a spacer 25 may be advantageous to orient the rails 24 per desired design specifications or to adjust to various vehicle tolerances. It is noted that more than one spacer may be applied, or even no spacer applied to achieve the desired positioning of the side rails 24 to the roll cage frame 18. Alternately, spacer 25 can be selected by its thickness to equal the spacing needed to achieve the desired positioning of the side rails 24 to the roll cage frame 18.

Figure 13:
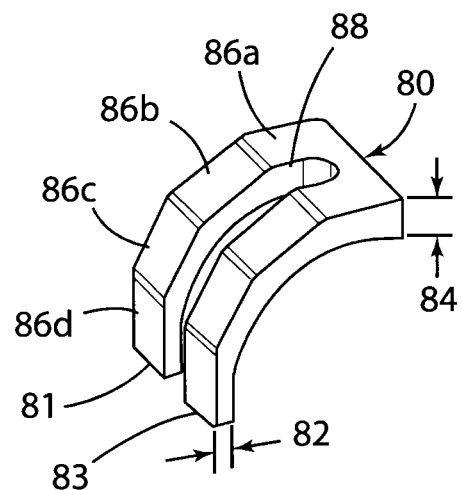
FIG. 13 is an enlarged perspective view of the adjustment element of FIG. 12.
Figure 14:
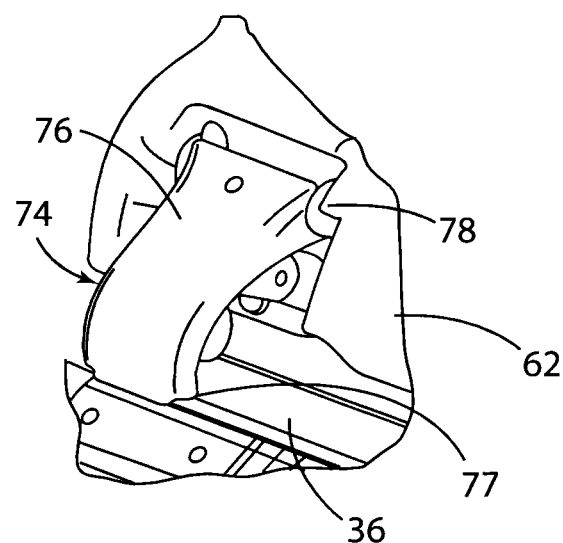
FIG. 14 is an enlarged fragmentary perspective view of a front latch mechanism for coupling a hard top panel to the windscreen frame and/or other 'body-in-white' areas.

One embodiment of an optional means that may be used to adjust the desired space between side rails 24 and longitudinal roll bars 19 is illustrated in FIGS. 11-13. As shown in FIGS. 11-12, a tapered adjustment element 80 may be provided for ease and efficiency of installation of the side rails 24 onto longitudinal roll bars 19, especially in the aftermarket, and permits customized installations, even beyond roll cage design tolerances.

Adjustment element 80 can be used to set the vertical orientation of the roll-cage 18 relative to side-rail 24. This attachment element 80 can be fixed in different orientations via a fastener 22, so that the distance between the longitudinal roll bar 19 and the side rail 24 can be varied as needed. As shown in FIG. 11 for illustrative purposes, adjustment element 80 is a one piece-construction that includes a plurality of integral sections (86a, 86b, 86c, 86d) that provide a series of stepwise increases in thickness of the adjustment element 80 along the circumference of adjustment element 80. Specifically, adjustment element 80 can have its greatest (i.e., maximum) thickness 84 at a first circumferential end or first section 86a. The stepwise thicknesses of the adjustment element 80 decreases along sections 86b, 86c (second and third sections), etc. to the smallest (i.e., minimum) thickness 82 at a second circumferential end or fourth section 86d. Although the adjustment element 80 is shown in FIGS. 11-13 as including four sections 86a, 86b, 86c and 86d that provide a stepwise increase/decrease in thickness of the adjustment element 80, it will be appreciated that adjustment element 80 includes four sections each having a different thickness for illustration purposes only. Namely, adjustment element 80 may be only two sections, three sections, five sections, or more sections of varying thickness, whenever necessary to accommodate for side rail 24 and/or roll bar tolerances.

In one approach each stepwise increase of the adjustment element 80 can be in the range of about 1-5 mm, preferably in the range of about 2-3 mm, and more preferably, 2 mm. Maximum thickness 84 of the adjustment element 80 can be in the range of about 5 to 10 mm, and minimum thickness 82 can be in the range of about 2 to 5 mm. During installation of side rail 24 to roll-cage frame 18, the installer, based on vehicle tolerances, can establish an appropriate spacing between side rail 24 and roll-cage frame 18, and install the adjustment element 80 in an appropriate orientation to provide a desired spacer thickness between the side rail 24 and longitudinal roll-bar 19 of the roll-cage frame 18 accordingly. As shown in FIG. 13, the exemplary adjustment element 80 may be U-shaped and includes a slot 88 between two arm members 81 and 83. FIGS. 11-12, fastener 22 passes through longitudinal roll bar 19 and can be positioned in the slot 88 and partially surrounded by arms 81 and 83 of adjustment element 80. When installing the side rails 24 on longitudinal roll bars 19, the user/installer can rotate adjustment element 80 until the desired step 86(a, b, c, or d) equals or nearly equals the desired distance or gap between side rail 24 and longitudinal roll-bar 19 of roll-cage frame 18, and then tighten fastener 22 to secure the side rail 24 to the longitudinal roll-bar 19.

For permanent installations, adjustment element 80 may be positioned in the variable gap between the side rails 24 and the longitudinal roll bars 19 in an orientation that provides an appropriate thickness (along one of sections 86a, 86b, 86c, or 86d) before finally attaching the side rail 24 with fastener 22 (e.g., bolt) or similar mechanical element that permits a detachable or non-detachable attachment of side rail 24 to longitudinal roll-bar 19. For example, side rails 24 can be held in desired position relative to longitudinal roll-bar 19 by assembly brackets welded onto the roll-bars 19 or by attachment directly (by bolts or welding) to other parts of the vehicle body.

During installation of the side rails 24 onto longitudinal roll-bars 19 of the roll-cage frame 18, the fasteners 22 for the attachment of the side rails 24 can be initially loosely attached to longitudinal roll-bar 19 to ease the process. The adjustment elements 80 may be then slid into the gap between the side rails 24 and the roll-bar frame 18 around the fastener 22. Since the adjustment elements 80 have several sections (86a, 86b, 86c, 86d) of different heights (i.e., thicknesses), the adjustment elements 80 are rotated and/or slid into the gap between the side rails 24 and longitudinal roll-bar 19 until a desired location and orientation of the adjustment elements 80 has been reached and fastener 22 can be finally fixed into place to secure the side rails 24 to longitudinal roll-bars 19. This method significantly reduces the amount of adjustment work, provides a more defined and robust attachment procedure and provides added security when assembling the side rails 24 to the roll-cage frame 18 of the vehicle 10.

Generally FIGS. 1 and 2-10 show various components to a convertible assembly 38 having a soft top canopy 14 attached to the side rails 24.

FIG. 15 show detail of portions of one side of the convertible assembly 38 in cross section to illustrate attachment of various components, including the attachment of the side rail 24 to longitudinal roll bar 19 of the roll cage frame 18. For example, in FIG. 15, the convertible assembly 38 has a side rail 24 having a first seal 28 and a second seal 30. First seal 28 can provide a weather resistant seal between side rail 24 and the convertible soft top canopy 14. Second seal 30 can provide a weather resistant seal between side rail 24 and vehicle doors 16 and 17. The seals 28 and 30 may be made of rubber, polymeric, plastic, or other materials that would provide a seal when installed as shown in FIG. 15. The side rail includes an integrally formed or attached convertible track guide assembly 20 and a guide member 32 (which is preferably U-shaped) can be slidably attached to the side rail 24 for travel along the length of the convertible track guide 26. Guide member 32 can attached to the various soft top framework components (e.g., cross bow 108) supporting soft top canopy 14. While the preferred embodiment allows attachment to a roll bar, it is noted that the present embodiments can also be incorporated into the body-in-white.

Figure 4:
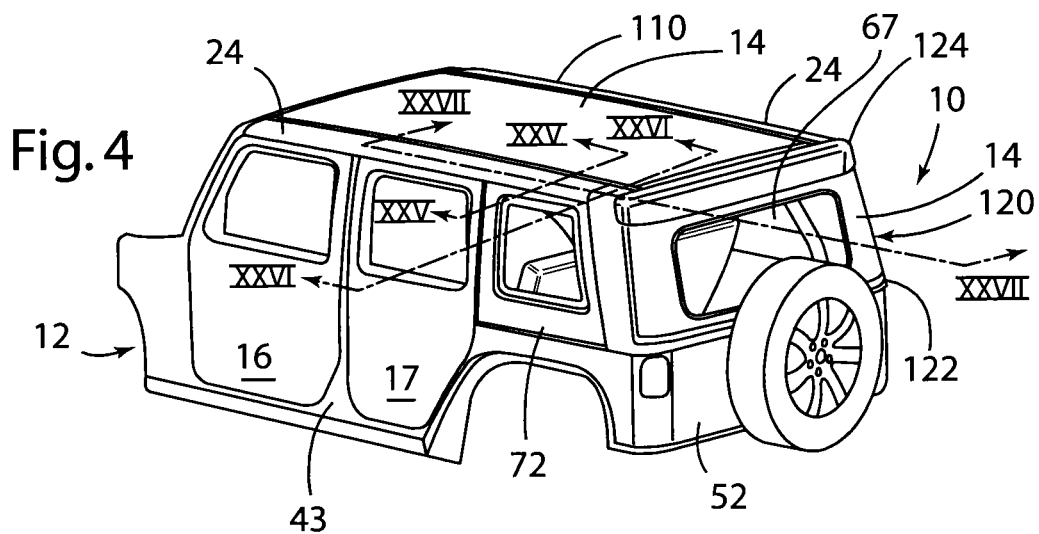
FIG. 4 is a perspective view of the vehicle framework of FIG. 2 with the side rails, rear quarter panel, soft top, and rear cassette according to one embodiment of the modular convertible assembly secured thereto.
Figure 25:
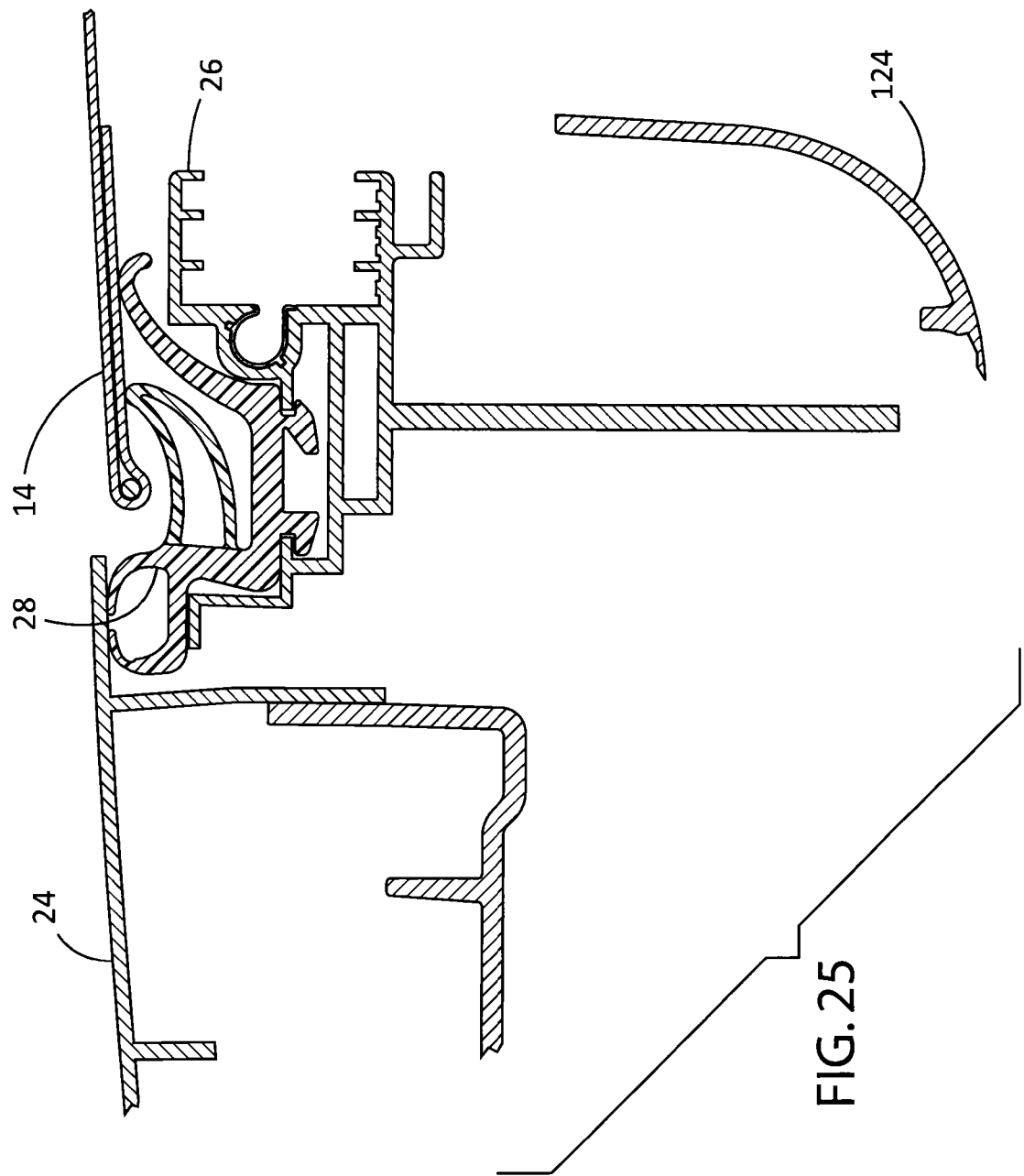
FIG. 25 is a side sectional fragmentary view of a vehicle taken along section lines XXV-XXV in FIG. 4.
Figure 26:
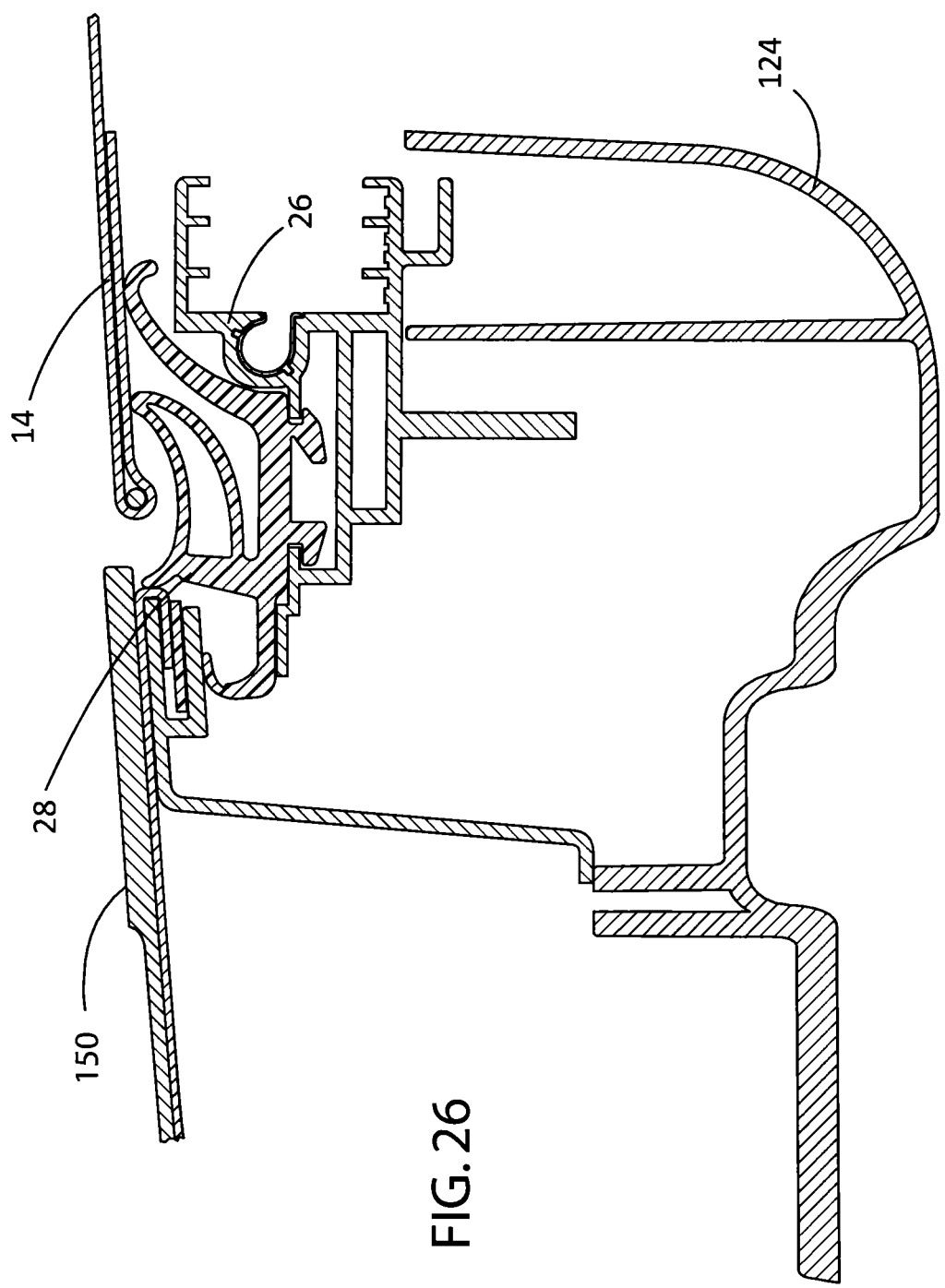
FIG. 26 is a side sectional fragmentary view of a vehicle taken along section lines XXVI-XXVI in FIG. 4.
Figure 27:
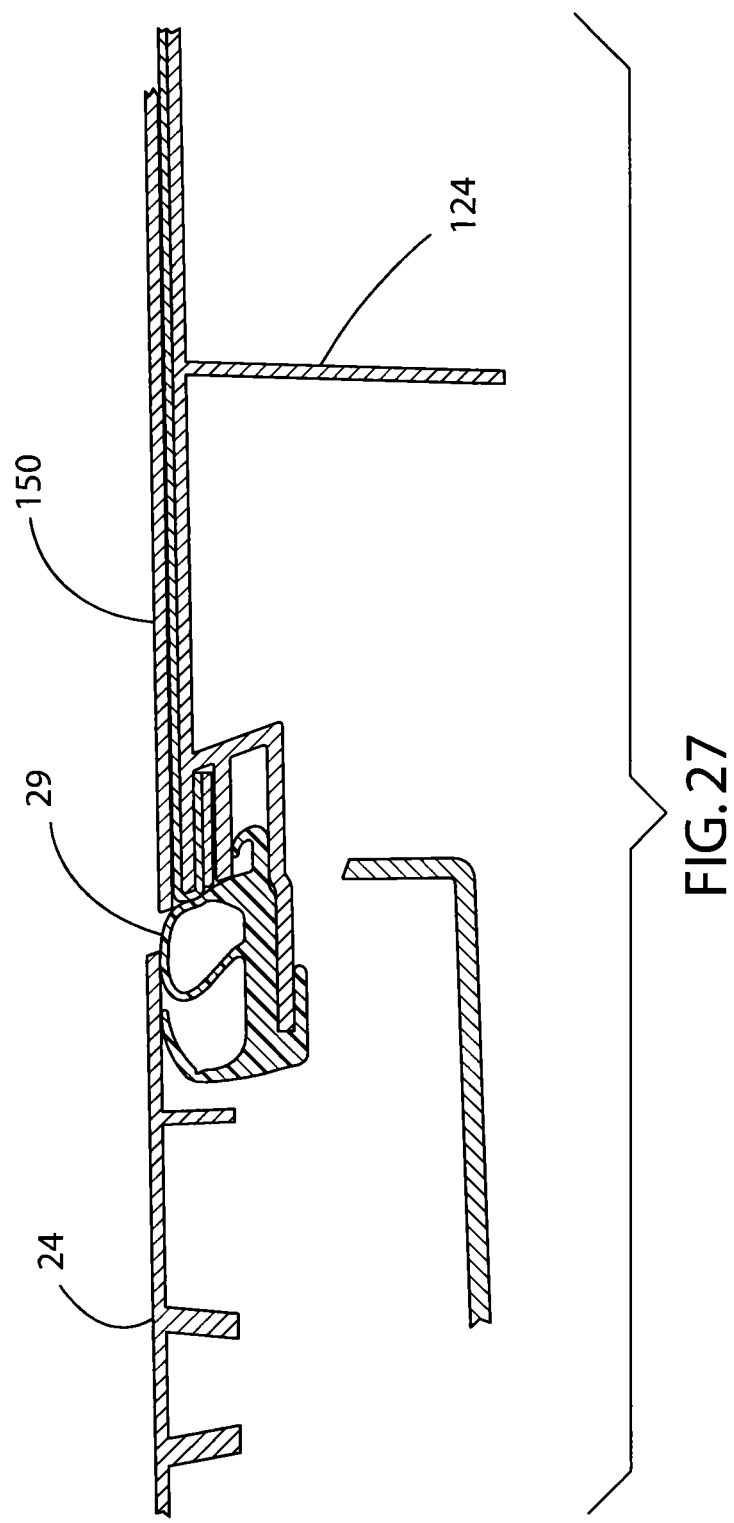
FIG. 27 is a side sectional fragmentary view of a vehicle taken along section lines XXVII-XXVII in FIG. 4.

FIGS. 26-27 show additional detail of the side rail 24 and vehicle soft top canopy 14 orientation per the sectional view of FIG. 4. In FIG. 25 seal 28 shows the added detail of water management channels and the structure of convertible track guide 26. FIG. 26 shows the orientation and structure of convertible track guide 26 seal 28 continue into drive cassette 124. FIG. 27 shows the orientation of the longitudinal sectional view XXVII of FIG. 4 where side rail 24 terminates into drive cassette 124 and is sealed by seal 29.

Figure 8:
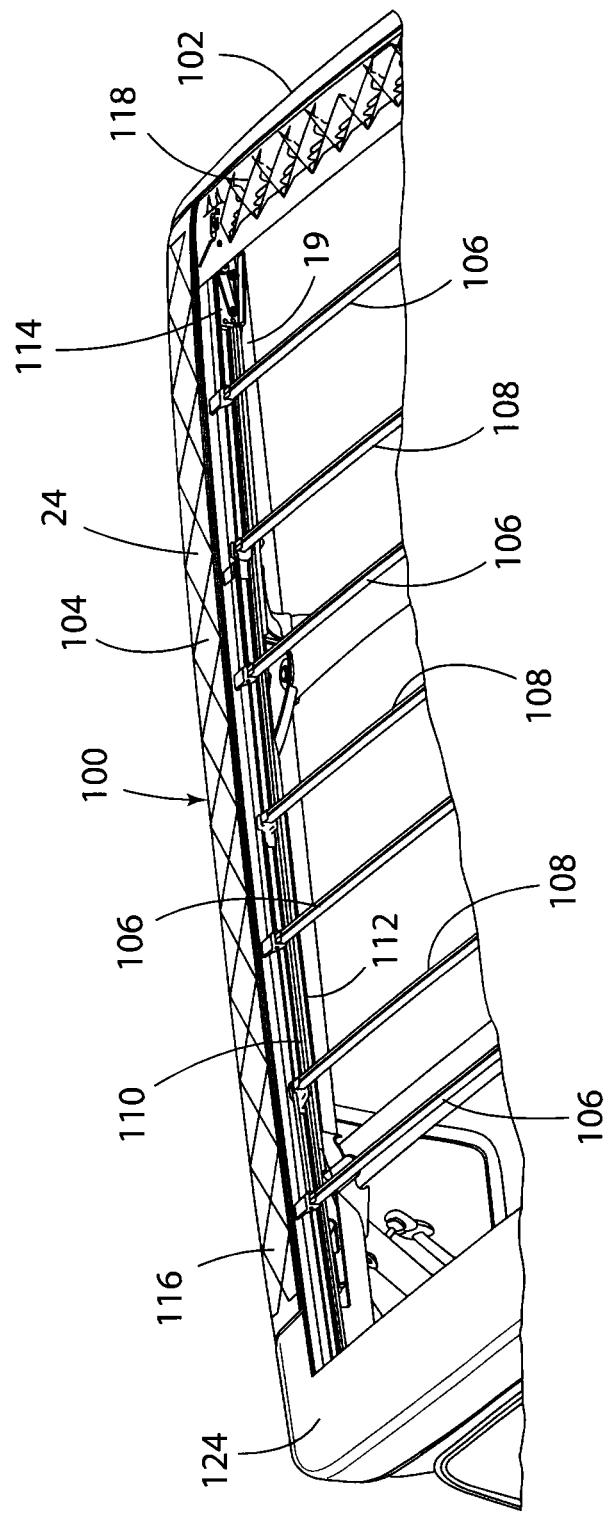
FIG. 8 is a partial perspective view of one exemplary embodiment of a soft top convertible assembly attached to a vehicle framework, with the soft top canopy not being shown for clarity.
Figure 9:
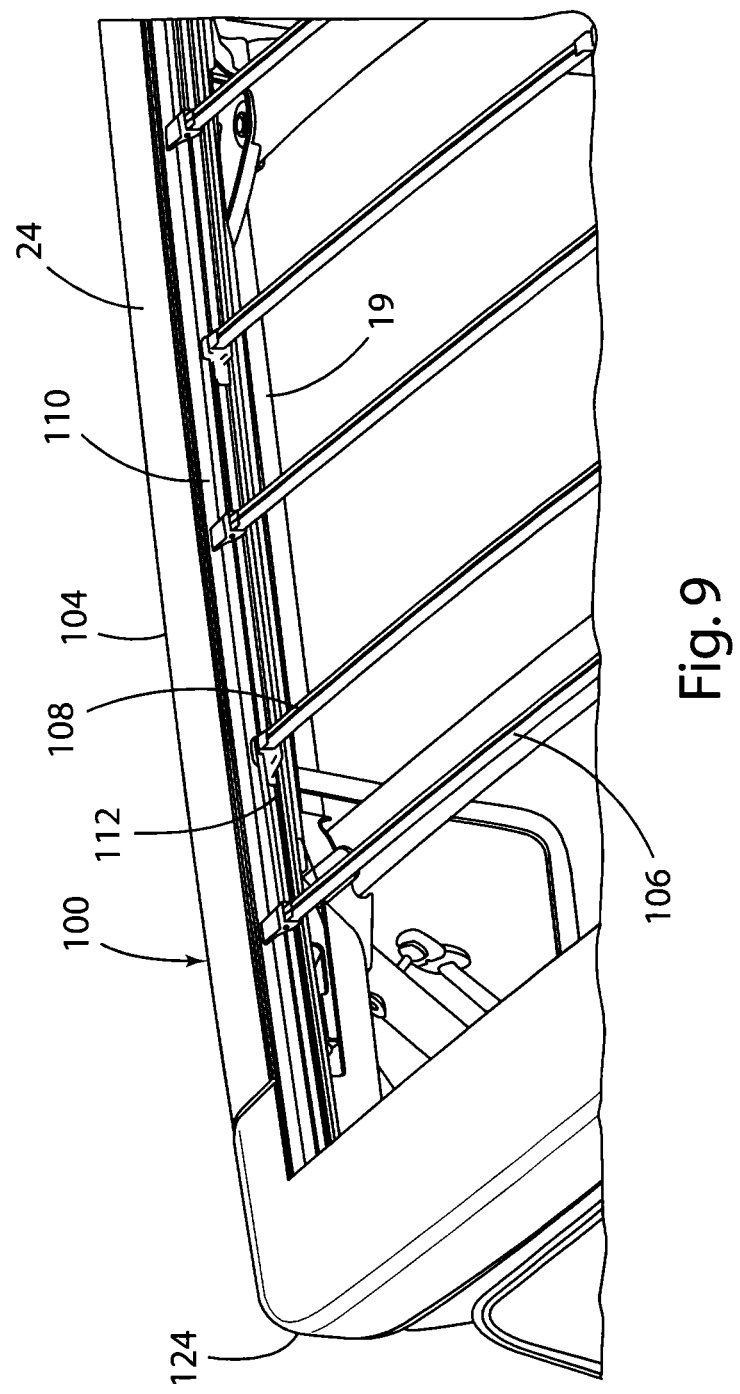
FIG. 9 is an enlarged fragmentary perspective view of the rearward portion of the soft top convertible assembly of FIG. 8, with the soft top canopy not being shown for clarity.
Figure 10:
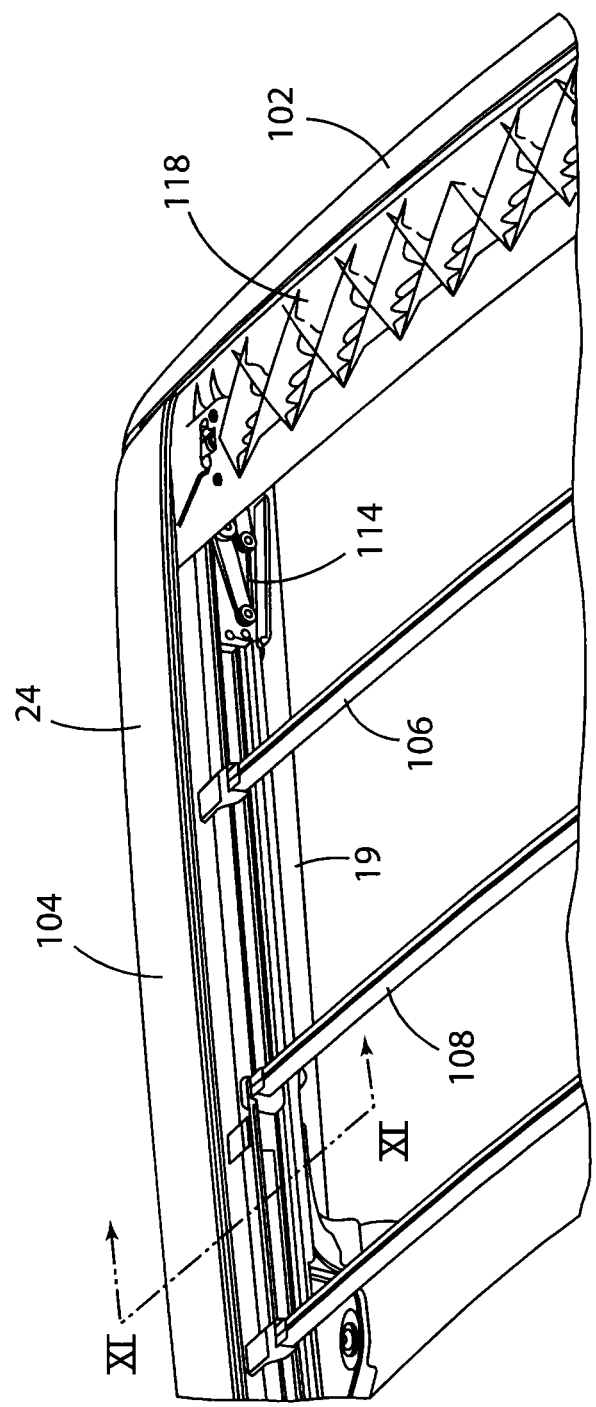
FIG. 10 is an enlarged fragmentary perspective view of the forward portion of the soft top convertible assembly of FIG. 8, with the soft top canopy not being shown for clarity.

As shown in FIGS. 8-10, side rails 24 can be incorporated into a soft top module 100. Soft top module 100 provides guideways 110 in side rails 24 to extend and retract a convertible roof such as soft top canopy 14. Soft top module 100 can also be configured to optionally and additionally accommodate attachment of rigid panels, as described in more detail below. More specifically, soft top module 100 provides guideways 110 and 112 to slidably engage transverse tension bows 106 and 108 respectively. A track car 114 can be provided to facilitate sliding of the bows 106 and 108 along the length of sliding members or guideways 110 and 112, which may be in the form of tracks. It is noted that in FIGS. 8-10, a soft top canopy 14 would be present in actual use, but the soft top canopy 14 has been removed in FIGS. 8-10 for clarity of the mechanism underlying the movement of the soft top canopy 14. Side rails 104 can also have longitudinal soft top canopy material 116 overlying the side rail element.

Figure 1:
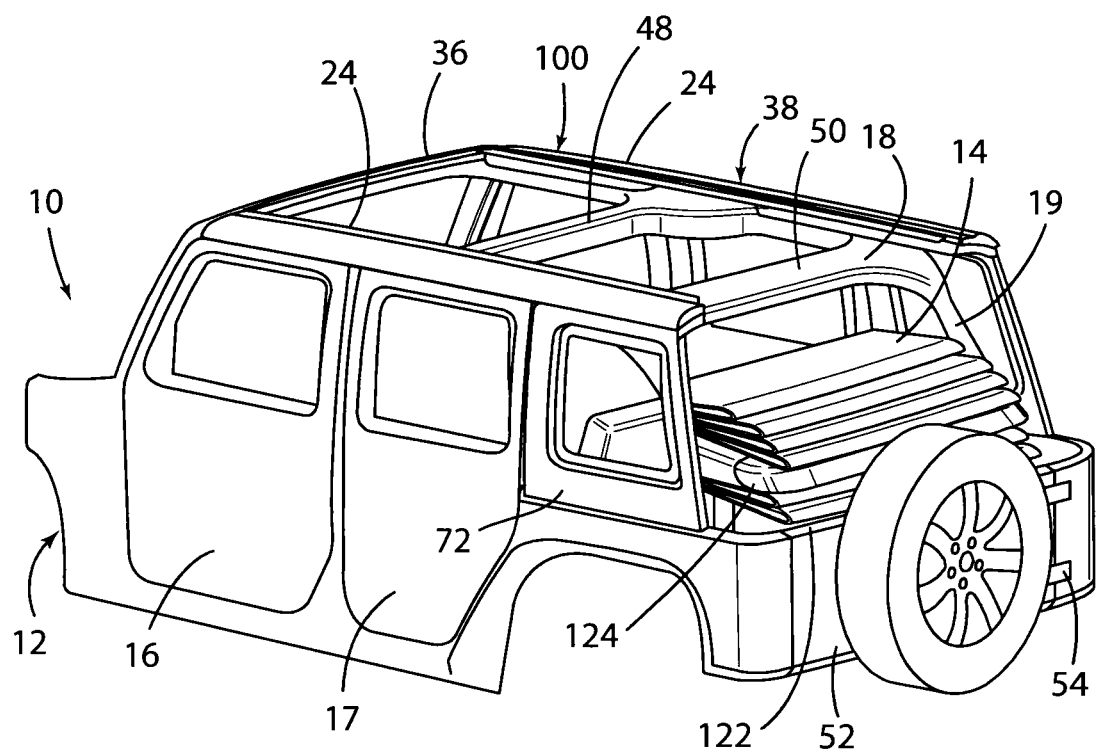
FIG. 1 is a perspective view of an exemplary vehicle framework including installed side rails, rear quarter panel, and rear cassette according to one embodiment of a modular convertible assembly, with the soft top having been retracted to a stowed position.
Figure 5:
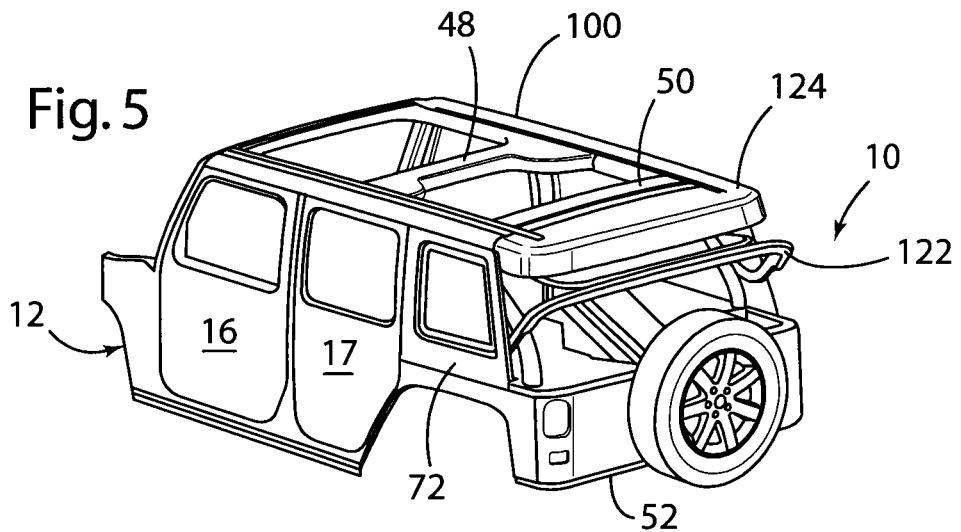
FIG. 5 is an enlarged fragmentary perspective view of the vehicle body framework and the modular convertible assembly of FIG. 1, the canopy not shown for clarity and the hatch being in a raised/opened position.

As shown, for example, in FIGS. 1, 4 and 8, a preferred embodiment of the convertible assembly 38 includes a rear cassette module 124 that can lower the convertible assembly 38 behind the roll-cage frame 18 (when a user desires to open the roof of the vehicle 10), but remain in front of a CHMSL of the vehicle 10. In this instance, the soft top canopy 14 as illustrated remains inboard of the roll cage frame 18 (FIG. 1). In the preferred embodiment, the soft top canopy 14 forms a weather (e.g., water and wind) tight seal along sill 13 of the vehicle 10 as shown in FIG. 4. The convertible assembly 38 also includes a sealing bow 122 where the rearward assembly abuts the vehicle body 12. As shown in FIGS. 5-7, sealing bow 122 is pivotally mounted to vehicle body 12 to rotate upwards to form an optional hatch 122 which is movable from a closed position (FIG. 4) to an open position (FIGS. 6 and 7) to accommodate the storage of various items of cargo 130 in a trunk of the vehicle 10.

The convertible assembly 38 may include other optional components and features. For example, a wiper system can optionally be included on the backlite 67 (FIG. 4) of the convertible soft top canopy 14. The soft top canopy 14 may be vertically attached to cross bows 102, 106 and 108 (shown in FIGS. 8, 9 and 10). As shown in FIG. 8, cross bow 102 can be a front bar module to connect to windscreen frame 36. Transverse front cross bow 102 can have a connection point 118 to the soft top canopy 14. Optionally, the convertible assembly 38 may include a rear spoiler 150.

In one preferred embodiment, rear cassette 124 of the convertible assembly is part of a rear module 120 (FIG. 4) and is coupled to separate powered motive force to retract soft top canopy 14 along the guideways 110, 112. The rear cassette 124 may be configured to provide a weather-tight seal via sealing components installed where rear cassette 124 and soft top canopy 14 engage in the aft corner of the vehicle 10. Additional and/or alternative water management and sealing assemblies for the convertible roof assembly 38 can also be incorporated into the rear cassette 124. That is, the convertible assembly 38 can provide a weather tight seal outboard of the roll cage frame 18 of the vehicle 10.

According to one approach illustrated in FIGS. 16-21, a modular hard-top assembly 60 according to one exemplary embodiment is attached to the vehicle body 12 and/or side rails 24 (or quarter window 72). In the illustrated embodiment, structural support for the modular hard-top assembly 60 is provided mainly by longitudinal roll-bars 19 of the roll-cage frame 18. In the embodiment shown in FIG. 16, the modular hard-top assembly 60 includes a front panel 62, middle panel 64, and rear panel 66 with backlite 67, which can be opened using backlite hinges 70. The front panel 62 is preferably attached to the side rails 24, cross-bar 48 and/or vehicle body 12 by the use of hand operated latches (or other suitable attachment mechanisms) of the front panel 62 locking onto strikers in the side rail 24, cross bar 48 and/or vehicle body 12.

Figure 23:
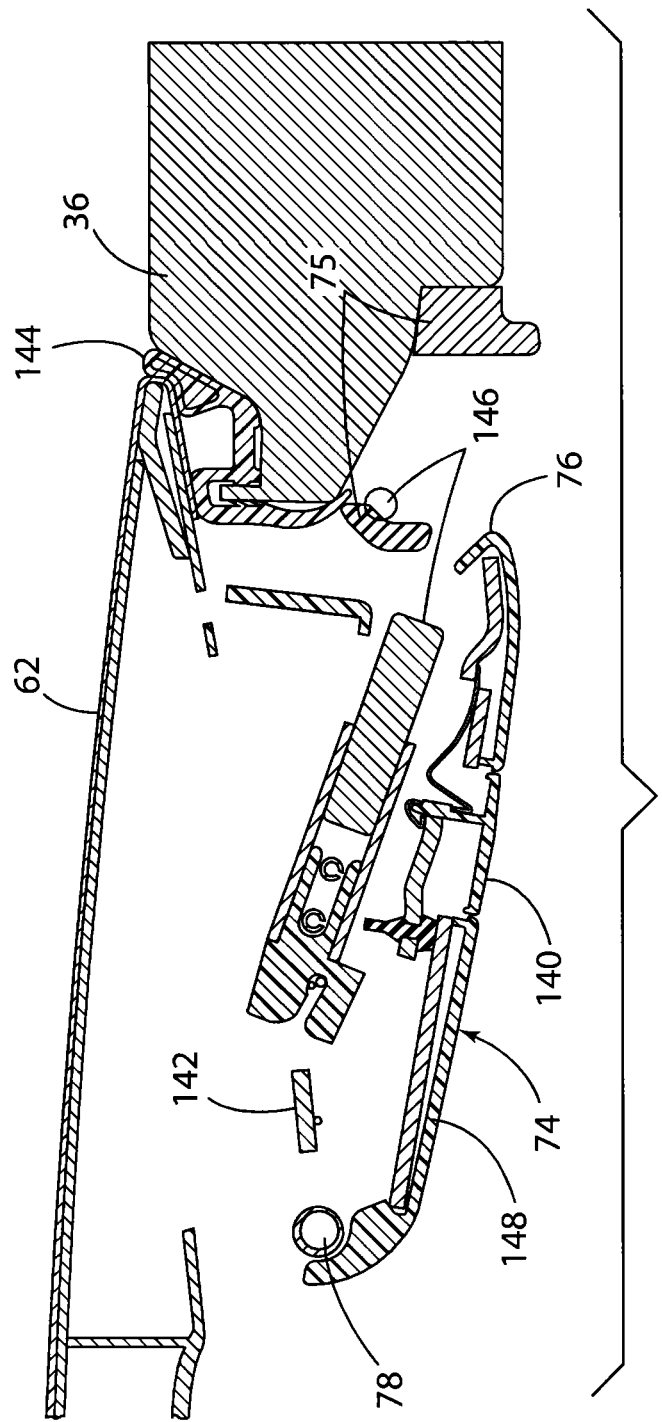
FIG. 23 is a side sectional fragmentary view of a vehicle taken along section lines XXIII-XXIII in FIG. 19, showing one exemplary attachment of a hard top panel to the wind screen frame of the hard top convertible assembly of FIG. 19 (to the front hard top panel).
Figure 24:
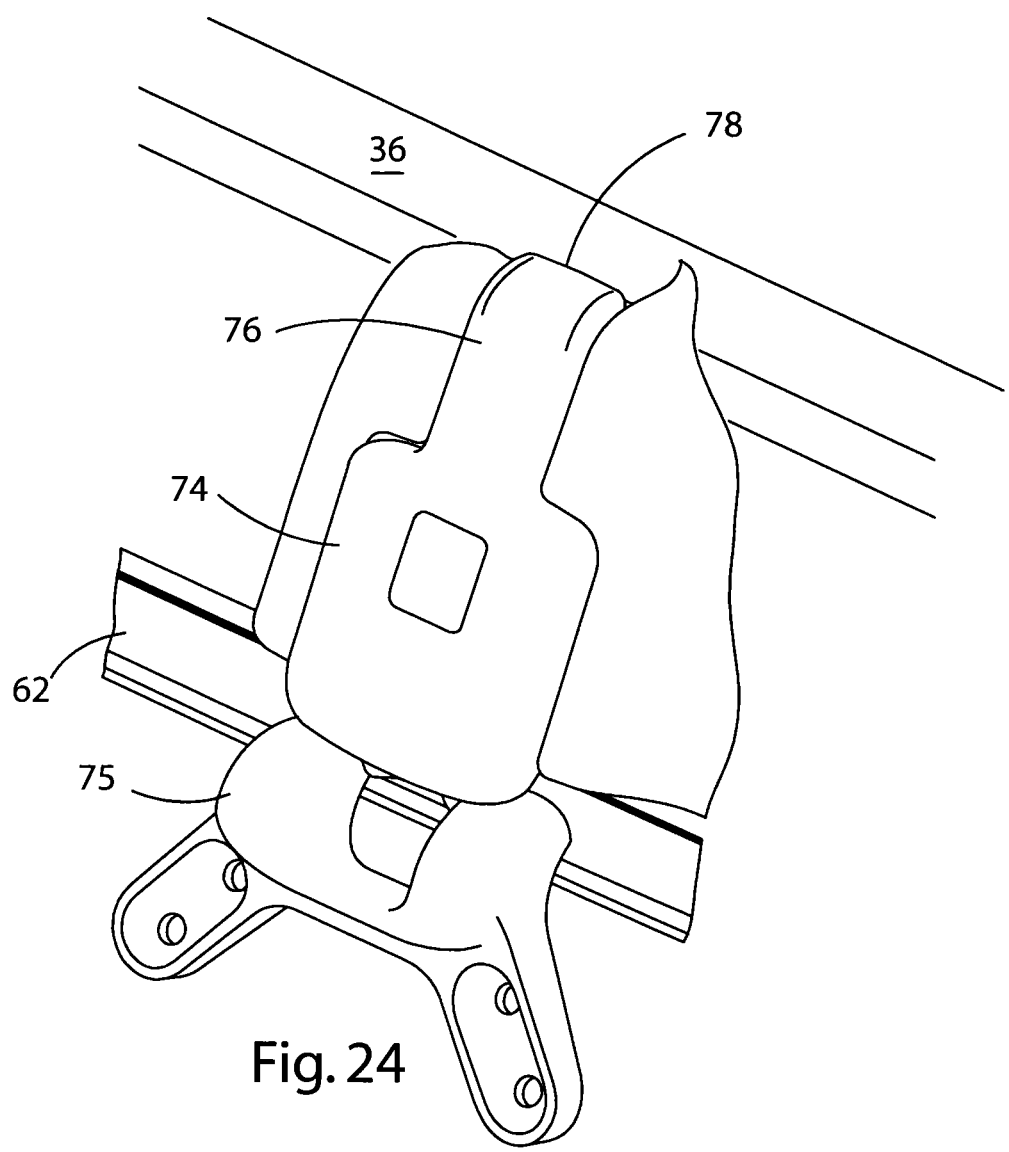
FIG. 24 is a perspective view of one embodiment of a latch/striker of an exemplary hardtop panel to the wind screen frame.

An exemplary attachment of the front panel 62 to the windscreen frame 36 in cross-section to show more detail is shown in FIG. 23. As shown in FIGS. 23 and 24, front panel 62 can be latched to windscreen frame 36 by a front latch 74 mechanism. Front latch 74 has latch arm 76 pivotally attached front panel 62 at a latch arm pivot 78 on latch bracket 142. Windscreen 36 has a front latch striker 75 to engage a front panel 62 latch hook 146 in a closed position. A weather tight seal is provided by seal 144 attached to windscreen frame 36. Front latch 74 may also have a user operated handle 148 and a release mechanism 140.

The middle panel 64 preferably uses the same principle of attachment to the side rail 24, cross bar 48 and/or vehicle body 12, with the added option of attachment of the middle panel 64 to the rear panel 66. Rear panel 66 can be attached directly to the vehicle body 12 using bolts (or other fastening means) along a lower edge 69 of the rear panel 66 itself with optional additional attachments to the side rail 24, quarter window 72 and middle panel 64 in a similar manner as described above. Similar to the rear cassette 124 of the convertible assembly 38 of FIG. 1 described above, rear panel 66 includes the backlite system, seal interfaces, vision, hinging, wiring and hoses, BIW interfaces of the hard-top assembly 60.

In one preferred embodiment, side rails 24 can also be used for attachment points of modular roof panels. Thus, side rails 24 can be used not only for providing guide-ways for the cross bows of a soft-top canopy 14, but also for the attachment of modular hard-top panels of the hard-top assembly 60 such, as shown in FIGS. 16-21. Thus, the side rails 24 in the exemplary embodiments of FIGS. 16-21 are provided with guiding channels for the soft top applications, but also provide for attachment of hard fixed panels (e.g., 62 and 64) as well.

In one preferred embodiment, the fixed panels 62 and 64 of the hard-top assembly 60 can have latches configured to removably attach at various points along the side rail 24. For example, in FIG. 16, two hard panels (front panel 62 and rear panel 64), which may be non-transparent or transparent, are attached. These hard top panels 62 and 64 preferably have the structure and composition of typical body panels of the hard-top assembly.

Figure 16:
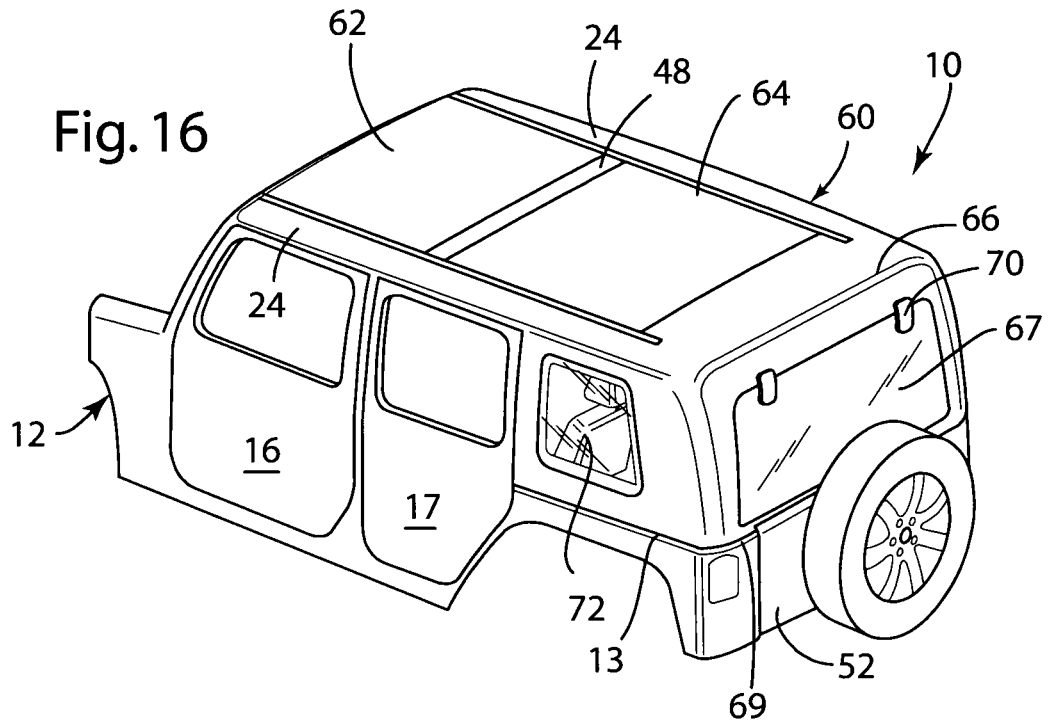
FIG. 16 illustrates a perspective view of an embodiment of a hard top convertible assembly including an attached front hardtop panel, middle hardtop panel, and rear panel with backlite.
Figure 17:
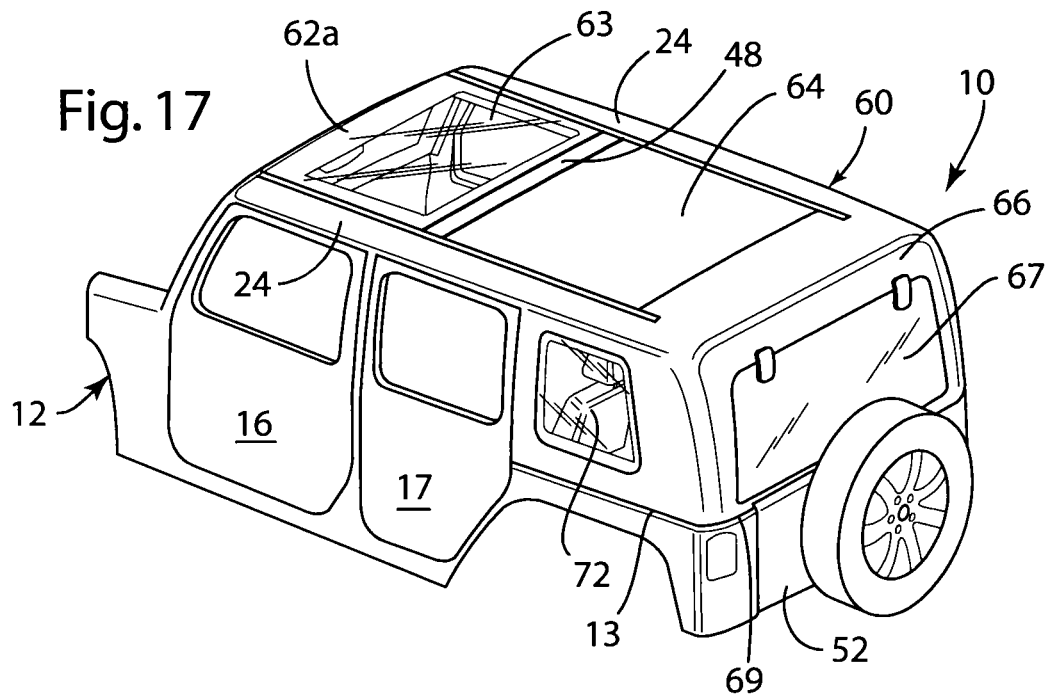
FIG. 17 illustrates a perspective view of an alternative embodiment of a hard top convertible assembly including an attached front clear panel, middle hardtop panel, and rear panel with backlite.
Figure 18:
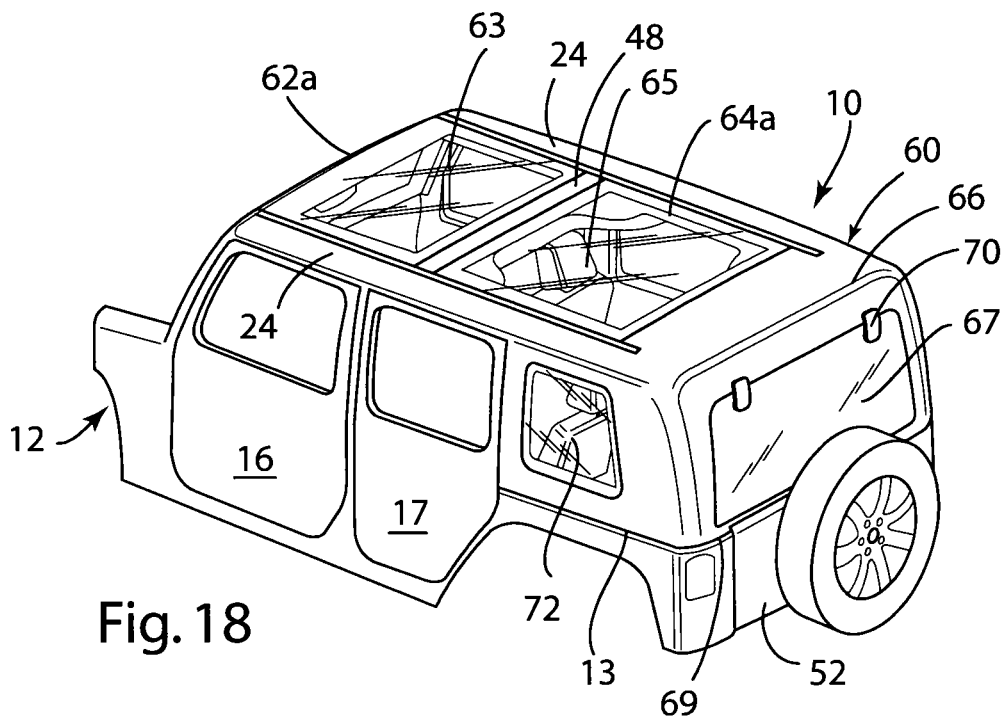
FIG. 18 illustrates a perspective view of an alternative embodiment of a hard top convertible assembly including an attached front clear panel, middle clear panel, and rear panel with backlite.
Figure 19:
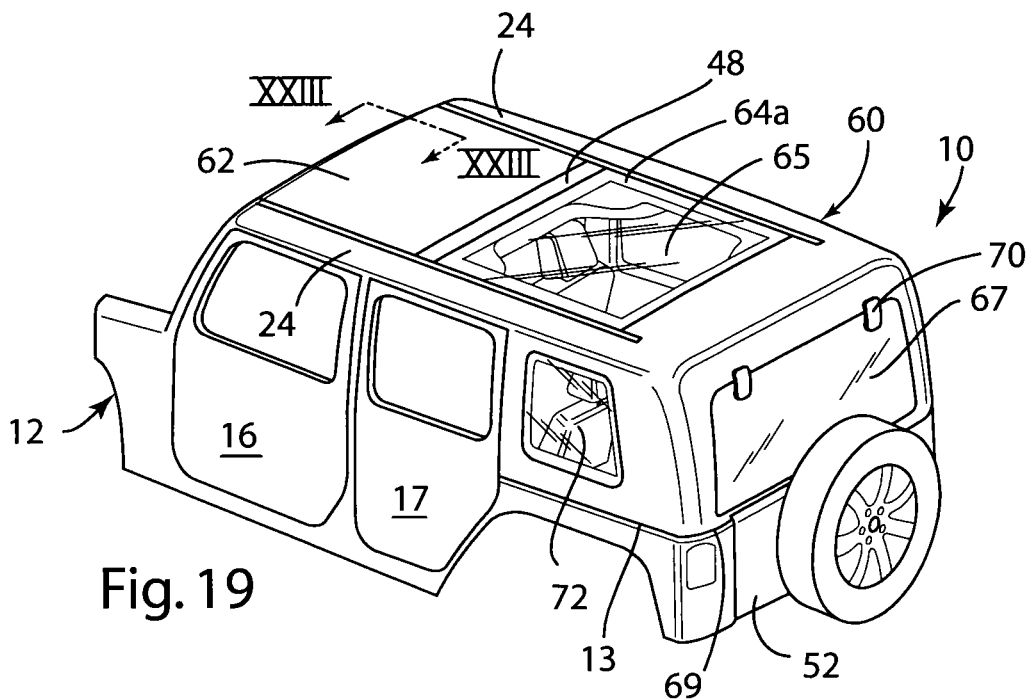
FIG. 19 illustrates a perspective view of an alternative embodiment of a hard top convertible assembly including an attached front hardtop panel, middle clear panel, and rear panel with backlite.
Figure 22:
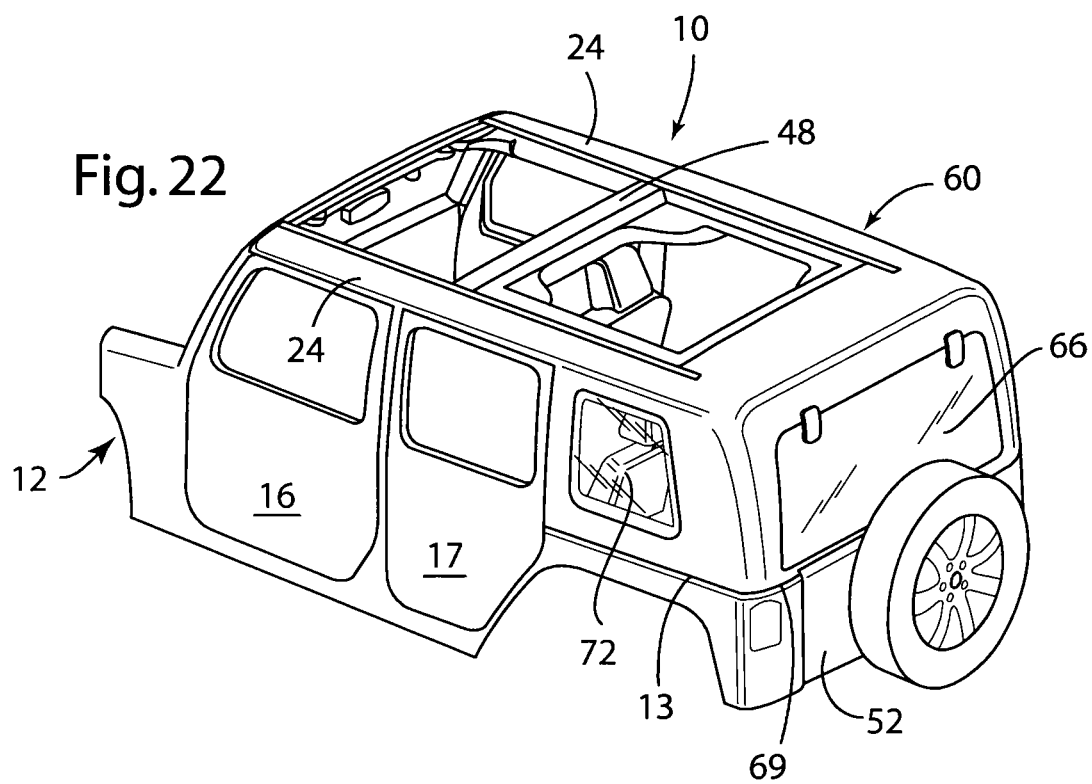
FIG. 22 illustrates a perspective view of an alternative embodiment of a hard top convertible assembly without an attached front panel and without an attached middle panel, but including an attached rear panel with backlite.

In the embodiment illustrated in FIG. 17, the hard top assembly 60 includes a front panel 62a with an optional fixed clear panel component (e.g., sunroof 63) and a rear panel 64 as in FIG. 16. In the embodiment illustrated in FIG. 18, the hard top assembly 60 includes a front panel 62a with an optional sunroof 63 as well as rear panel 64a, which has a fixed sunroof 65. In the embodiment illustrated in FIG. 19, the hard top assembly 60 includes a rear panel 64a with an optional fixed sunroof 65 while the front panel 62 is the same as the front panel 62 of FIG. 16. In FIG. 20, the hard top assembly 60 is configured without the front panel 62, but with a rear panel 64a, which has a fixed sunroof 65. In FIG. 21, the hard top assembly 60 is configured without the rear panel 62, but with a front panel 62a, which has a fixed window 63. In FIG. 22, the hard top assembly 60 is configured without the front panel 62 and without the rear panel 64. Preferably, the rear quarter panel 72 is also independently removable. With a half-door option, the convertible assemblies (soft-top assembly 38 or hard-top assembly 60) could be configured as a "flat-top".

While preferred embodiments have been described in detail, variations and modifications can be effected within the scope of the present embodiments.

We claim:

1. A modular roof assembly, comprising:
   a pair of side rails configured for attachment to a pair of longitudinal roll bar members of a vehicle frame by at least one fastener, the side rails extending from a wind screen frame in a rearward direction along an entire length of the vehicle roof;
   the side rails having at least one inboard guideway to slidably receive transverse tensioning bows and a track car for a soft top; and
   the side rails further adapted to receive at least one hard top panel.

2. The modular roof assembly of claim 1, wherein the rear assembly comprises a cassette adapted to be sealingly coupled to rearward ends of the side rails and including a motive force to drive the track car and tensioning bows along a predetermined travel path within the at least one guideway.

3. The modular roof assembly of claim 2, wherein the soft top is attached to the tensioning bows providing a weather tight seal for the vehicle roof when the tensioning bows are in an extended position.

4. The modular roof assembly of claim 2, wherein the rear assembly is operable to lower a retracted soft top and rear cassette to a sill of the vehicle frame, whereby the roof is retracted to the sill of the vehicle frame.

5. The modular roof assembly of claim 2, wherein the rear cassette comprises a soft top rear panel having a backlite.

6. The modular roof assembly of claim 2, wherein the rear cassette comprises a soft top rear panel having a backlite providing a weather tight seal with a sill of the vehicle frame.

7. A modular roof assembly, comprising:
   a pair of side rails configured for attachment to a pair of longitudinal roll bar members of a vehicle frame by at least one fastener, the side rails extending from a wind screen frame in a rearward direction along an entire length of the vehicle roof;
   the side rails having at least one inboard guideway to slidably receive transverse tensioning bows and a track car for a soft top; and
   the side rails further adapted to receive at least one hard top panel;
   wherein a weather tight seal with a sill of the vehicle frame is an upwardly pivoting hatch.

8. The modular roof assembly of claim 1, further comprising at least one rigid roof panel, releasably attached to at least the side rails.

9. A modular roof assembly, comprising:
   a pair of side rails configured for releasable attachment above a pair of longitudinal roll bar members of a vehicle frame by at least one fastener, the side rails extending along at least an entire length of a vehicle roof frame;
   the side rails having at least one inboard guideway along its entire length to slidably receive transverse tensioning bows and a track car for a soft top; and
   the side rails further adapted to receive at least one hard top panel.

* * * * *